(12) United States Patent
Tagashira et al.

(10) Patent No.: US 9,979,327 B2
(45) Date of Patent: May 22, 2018

(54) ROBOT CONTROL SYSTEM

(71) Applicant: KAWASAKI JUKOGYO KABUSHIKI KAISHA, Kobe-shi, Hyogo (JP)

(72) Inventors: Tsuyoshi Tagashira, Kakogawa (JP); Koji Muneto, Kobe (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 0 days. days.

(21) Appl. No.: 15/108,497

(22) PCT Filed: Dec. 19, 2014

(86) PCT No.: PCT/JP2014/083716
§ 371 (c)(1),
(2) Date: Jun. 27, 2016

(87) PCT Pub. No.: WO2015/098753
PCT Pub. Date: Jul. 2, 2015

(65) Prior Publication Data
US 2016/0329841 A1 Nov. 10, 2016

(30) Foreign Application Priority Data
Dec. 26, 2013 (JP) ................................. 2013-270299

(51) Int. Cl.
*G05B 19/18* (2006.01)
*H02P 1/00* (2006.01)
(Continued)

(52) U.S. Cl.
CPC ............... *H02P 5/74* (2013.01); *B25J 9/161* (2013.01); *H02M 5/4585* (2013.01); *H02P 3/18* (2013.01);
(Continued)

(58) Field of Classification Search
None
See application file for complete search history.

(56) References Cited

U.S. PATENT DOCUMENTS

| | | | |
|---|---|---|---|
| 5,994,864 A * | 11/1999 | Inoue | B25J 9/1633 318/568.2 |
| 8,847,539 B2 * | 9/2014 | Suzuki | H02P 3/22 318/139 |
| 2013/0113411 A1 | 5/2013 | Suzuki et al. | |

FOREIGN PATENT DOCUMENTS

| | | |
|---|---|---|
| JP | S60-191979 A | 9/1985 |
| JP | H11-289793 | 10/1999 |

(Continued)

OTHER PUBLICATIONS

Mar. 31, 2015 International Search Report issued in International Patent Application No. PCT/JP2014/083716.
(Continued)

*Primary Examiner* — Bentsu Ro
*Assistant Examiner* — Zemenay Truneh
(74) *Attorney, Agent, or Firm* — Oliff PLC

(57) ABSTRACT

The system has a converter for converting an AC current into a DC current, an inverter for inverting the DC power supplied from the converter into an AC power, a servo control device for controlling a drive of a servo motor, and a resistance regenerating circuit for consuming a regenerative energy. The servo control device has a plurality of motor control portions for enabling a plurality of servo motors to be controlled and a plurality of control port portions corresponding to a plurality of motor control portions. At least one of the plurality of motor control portions is configured so that a power supply regenerating control function portion and a control function portion for the servo motor can be switched. The robot control system capable of suppressing the increase of the development cost and adding the power supply regenerating function can be provided.

5 Claims, 2 Drawing Sheets

(51) Int. Cl.
  *H02P 5/74*  (2006.01)
  *H02P 3/22*  (2006.01)
  *B25J 9/16*  (2006.01)
  *H02M 5/458*  (2006.01)
  *H02P 3/18*  (2006.01)
  *H02P 6/24*  (2006.01)

(52) U.S. Cl.
  CPC ............... *H02P 3/22* (2013.01); *H02P 6/24* (2013.01); *G05B 2219/40462* (2013.01); *G05B 2219/41294* (2013.01); *Y10S 901/02* (2013.01)

(56) References Cited

FOREIGN PATENT DOCUMENTS

| JP | 2000-201492 A | 7/2000 |
|---|---|---|
| JP | 2011-101473 A | 5/2011 |
| JP | 2011-161612 A | 8/2011 |
| JP | 2013-102611 A | 5/2013 |
| JP | 2013-202762 A | 10/2013 |

OTHER PUBLICATIONS

Jul. 7, 2016 International Preliminary Report on Patentability issued in International Patent Application No. PCT/JP2014/083716.

\* cited by examiner

ROBOT CONTROL SYSTEM

TECHNICAL FIELD

The present invention relates to a robot control system for controlling a robot comprising a servo motor.

BACKGROUND ART

Conventionally, in a machine tool or the like, in order to dispose a regenerative energy generated when a servo motor driving a rotational axis of a movable portion thereof is slowed down, a system comprising both a resistance regenerating function of consuming regenerative energy in a regenerative resistor and a power supply regenerating function of regenerating the regenerative energy on an AC power supply side is known (PLT 1).

In contrast, in a industry robot, the regenerative energy generated when a servo motor connected to a rotational axis of a movable portion of a robot arm or the like is slowed down is usually smaller than the regenerative energy generated when a servo motor driving a rotational axis of a movable portion of a machine tool or the like is slowed down. Therefore, when the regenerative energy is expected to increase according to an increase of operation load factor of a robot, reinforcing the resistance regenerating function has been general rather than adding the power supply regenerating function.

However, also in an industrial robot, the regenerative energy generated in a servo motor becomes extremely large when an operation is performed at an extremely high load factor (repeating start/stop frequently), and therefore it is desirable to comprise the power supply regenerating function of regenerating the electric power into the power supply in addition to the resistance regenerating function of consuming the regenerative energy by the regenerative resistor.

CITATION LIST

Patent Literature

[PTL 1] Japanese Patent Application Laid-Open No. 2011-101473
[PTL 2] Japanese Patent Application Laid-Open No. 2013-202762

SUMMARY OF INVENTION

Technical Problem

Note that, when necessary functions are added and deleted according to work contents required by a user in an industrial robot, basic components driving the robot body need to be changed for each user, increasing the development cost.

Also the case that the power supply regenerating function is added to the industrial robot is no exception, and it is necessary to design a control portion exclusive for power supply regeneration and incorporate the same into a robot control system in order to add the power supply regenerating function to the robot control system, causing a problem that the development cost is increased.

The present invention is made considering the above-mentioned problems of the conventional art and its object is to provide a robot control system capable of suppressing the increase of the development cost and adding the power supply regenerating function.

Solution to Problem

In order to achieve the above-mentioned objects, the robot control system according to the present invention comprises a converter for converting an AC current from an AC power supply into a DC current, an inverter for inverting a DC power supplied from the converter into an AC power, a servo control device for controlling a drive of a servo motor based on a signal from a motor sensor attached to the servo motor, and a resistance regenerating circuit for consuming a regenerative energy generated in the servo motor, wherein the servo control device has a plurality of motor control portions for enabling the plurality of servo motors to be controlled and a plurality of control port portions corresponding to the plurality of motor control portions, at least one of the plurality of motor control portions having a power supply regenerating control function portion for controlling a power supply regenerating circuit and being configured so that the power supply regenerating control function portion and a control function portion for the servo motor can be switched.

Also, it is preferable that all of the plurality of motor control portions have the power supply regenerating control function portion.

Also, it is preferable that the power supply regenerating circuit includes an inverter having a configuration in common with the inverter for the servo motor.

Also, it is preferable that the power supply regenerating circuit is further provided.

Also, it is preferable that the power supply regenerating circuit has a reactor connected to the AC current power supply and a primary voltage sensor portion connected to a wiring connecting the reactor and the AC current power supply so as to detect a primary voltage.

Also, it is preferable that the inverter has a plurality of rectifier elements and a plurality of switching elements each connected in parallel with the corresponding one of the plurality of rectifier elements.

Advantageous Effect of Invention

According to the present invention, a robot control system capable of suppressing increase of the development cost and adding the power supply regenerating function can be provided.

DESCRIPTION OF EMBODIMENTS

Hereunder, a robot control system according to an embodiment of the present invention will be described referring to FIG. 1.

Figure 1:
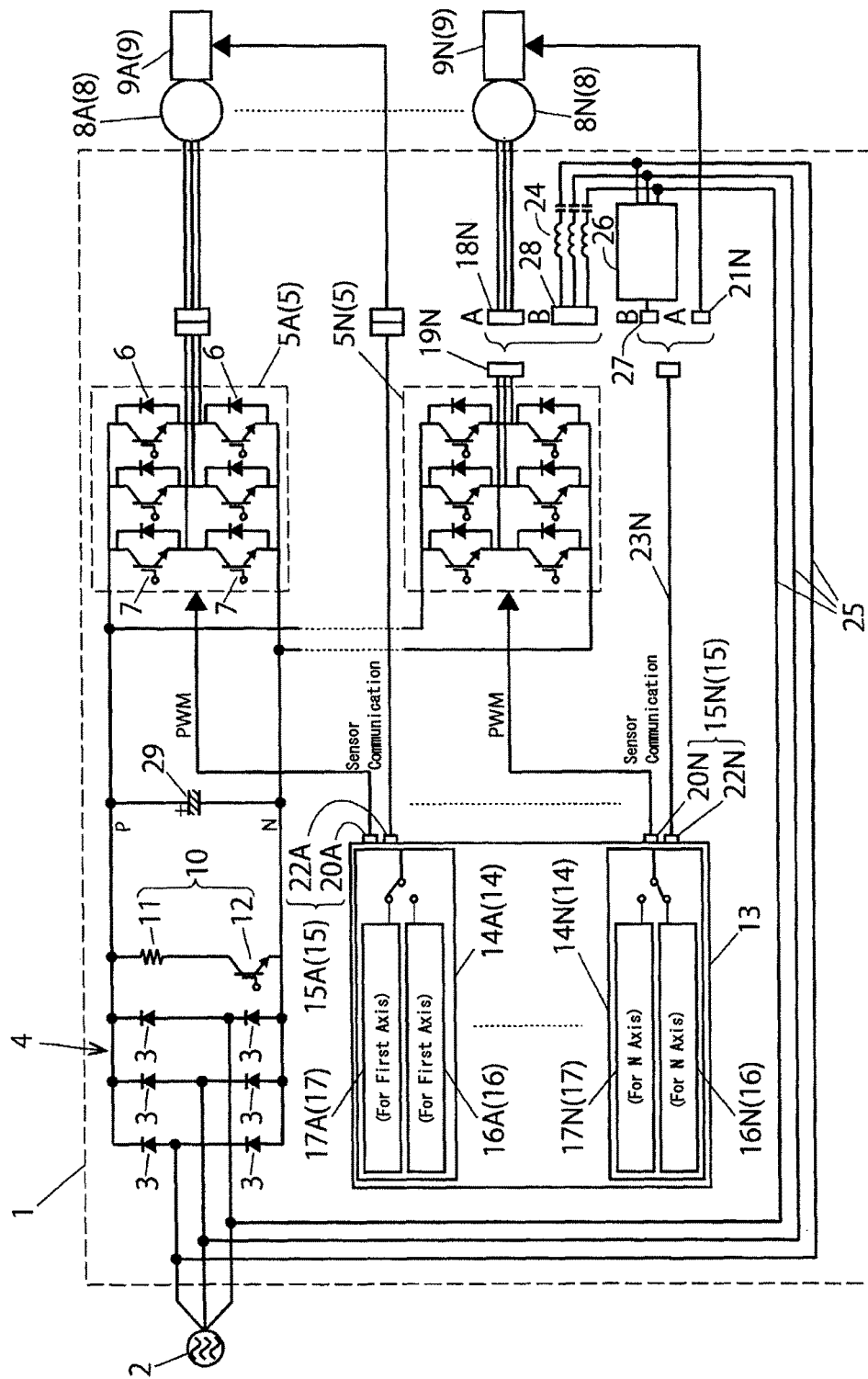
FIG. 1 is a block diagram illustrating a robot control system according to an embodiment of the present invention.

In a robot control system 1 illustrated in FIG. 1, an AC current from a three-phase AC power supply 2 is supplied to a converter 4 having a plurality of (six in the example) diodes (rectifier elements) 3, and the AC current is converted into a DC current in the converter 4. The DC current generated in the converter 4 is supplied to a plurality of (N in the example) inverters (DC-AC switching devices) 5 (5A, 5N).

The number N of installed inverters 5 is determined according to the number of drive shafts and external axes of a robot. For example, when a six-axis articulated robot has three external axes, the number N of installed inverters 5 is nine (six and three makes nine).

Each inverter 5 has a plurality of (six in the example) diodes 6 and a plurality of (six in the example) switching elements 7 each connected in parallel with the corresponding one of the plurality of diodes 6. Each inverter 5 inverts the DC current supplied from the converter 4 into an AC current and supplies the same into each servo motor 8 (8A, 8N). Motor sensors (encoders) 9 (9A, 9N) are attached to their respective servo motors 8.

A resistance regenerating circuit 10 is provided between the converter 4 and the inverters 5. The resistance regenerating circuit 10 is configured by connecting a regenerative resistor 11 and a switching element 12 in series.

The robot control system 1 according to the embodiment further comprises a servo control device (servo board) 13 for controlling drive of the servo motors 8. The servo control device 13 has a plurality of (N in the example) motor control portions 14 (14A, 14N) for controlling the respective servo motors 8 and a plurality of (N in the example) control port portions 15 (15A, 15N) corresponding to the plurality of motor control portions 14. Each motor control portion 14 controls drive of the corresponding servo motor 8 based on a signal from the corresponding motor sensor 9 attached to the same servo motor 8.

Additionally, each of the plurality of motor control portions 14 includes a power supply regenerating control function portion 16 (16A, 16N) for controlling a power supply regenerating circuit and also is configured so that the power supply regenerating control function portion 16 and a control function portion 17 (17A, 17N) for the servo motor 8 can be switched. The power supply regenerating control function portion 16 and the control function portion 17 for the servo motor 8 may be switched by changing settings or automatic detection.

Hereunder, in the robot control system 1 according to the embodiment, an example that the motor control portion 14N for a N axis (external axis) is used for power supply regeneration will be described.

First, when the motor control portion 14N for the N axis is used not for power supply regeneration but for controlling drive of the servo motor 8N of the N axis, a connector 18N of the servo motor 9N of the N axis is connected to a connector 19N of the inverter 5N for the N axis and also the inverter 5N for the N axis is connected to a port 20N for PWM of the control port portion 15N for the N axis. Also, a connector 21N of the motor sensor 9N attached to the servo motor 8N of the N axis is connected to a port 22N for sensor communication of the control port portion 14N for the N axis via a wiring 23N for sensor communication.

In contrast, when the motor control portion 14N for the N axis is used not for controlling drive of the servo motor 8N of the N axis but for power supply regeneration, a reactor 24 is connected to the three-phase AC power supply 2 and also a primary voltage sensor portion (phase detection portion) 26 for detecting primary voltage is provided to a wiring 25 connecting the reactor 24 and the three-phase AC power supply 2.

Additionally, a connector 27 of the primary voltage sensor portion 26 is connected to the port 22N for sensor communication of the control port portion 14N for the N axis. Further, the connector 28 of the reactor 24 is connected to the connector 19N of the inverter 5N for the N axis. Here, the inverter 5N for the servo motor 8N of the N axis comprises a configuration in common with an inverter configuring a power supply regenerating circuit, and the both can be used in common.

Note that a communication format (protocol) for motor control (encoder) and a communication format (protocol) for power supply regeneration (primary voltage sensor portion) are made common.

As above, when the motor control portion 14N for the N axis is used for power supply regeneration, change of settings or automatic detection enables switching from the control function portion 17N for the servo motor 8N of the N axis to the power supply regenerating function portion 16N.

In the robot control system 1 according to the embodiment above, when the level of a P-N smoothing capacitor 29 provided between the resistance regenerating circuit 10 and the inverter 5 is below a predetermined value, the power supply regenerating function by the power supply regenerative circuit including the inverter 5N for the N axis, reactor 24, and the primary voltage sensor portion 26 works. In contrast, when the level of the smoothing capacitor 29 of PN becomes the predetermined value or more, the regenerative energy is consumed in the resistance regenerating circuit 10.

As above, in the robot control system 1 according to the embodiment, the power supply regenerating control function portion 16 is standardly implemented in the servo control device 13 controlling drive of the servo motor 8, and one of the plurality of control ports 15 which have been previously prepared in the servo control device 13 is diverted so as to switch and properly select whether the port is used as a motor control port or a power supply regenerating port by changing settings or automatic detection. Therefore, a new control portion for power supply regenerating control does not need to be provided even when the power supply regenerating function is added corresponding to requests of a user. Thereby, increase of the development cost according to addition of the power supply regenerating function can be suppressed.

Also, as the power supply regenerating function can be provided by diverting the inverter 5 for robot control, it is not necessary to develop a new inverter for power supply regeneration separately, and therefore increase of the development cost according to addition of the power supply regenerating function can be further suppressed.

Note that, although the case that the motor control portion 14N for the N axis is used for power supply regeneration is described in the example above, the motor control portion 14 used for power supply regeneration is not limited to that for the N axis. For example, using the motor control portion 14A for a first axis for power supply regeneration is also possible, and the port 20A for PWM of the control port 15A for the first axis and the port 22A for sensor communication are used for power supply regeneration in the case.

Figure 2:
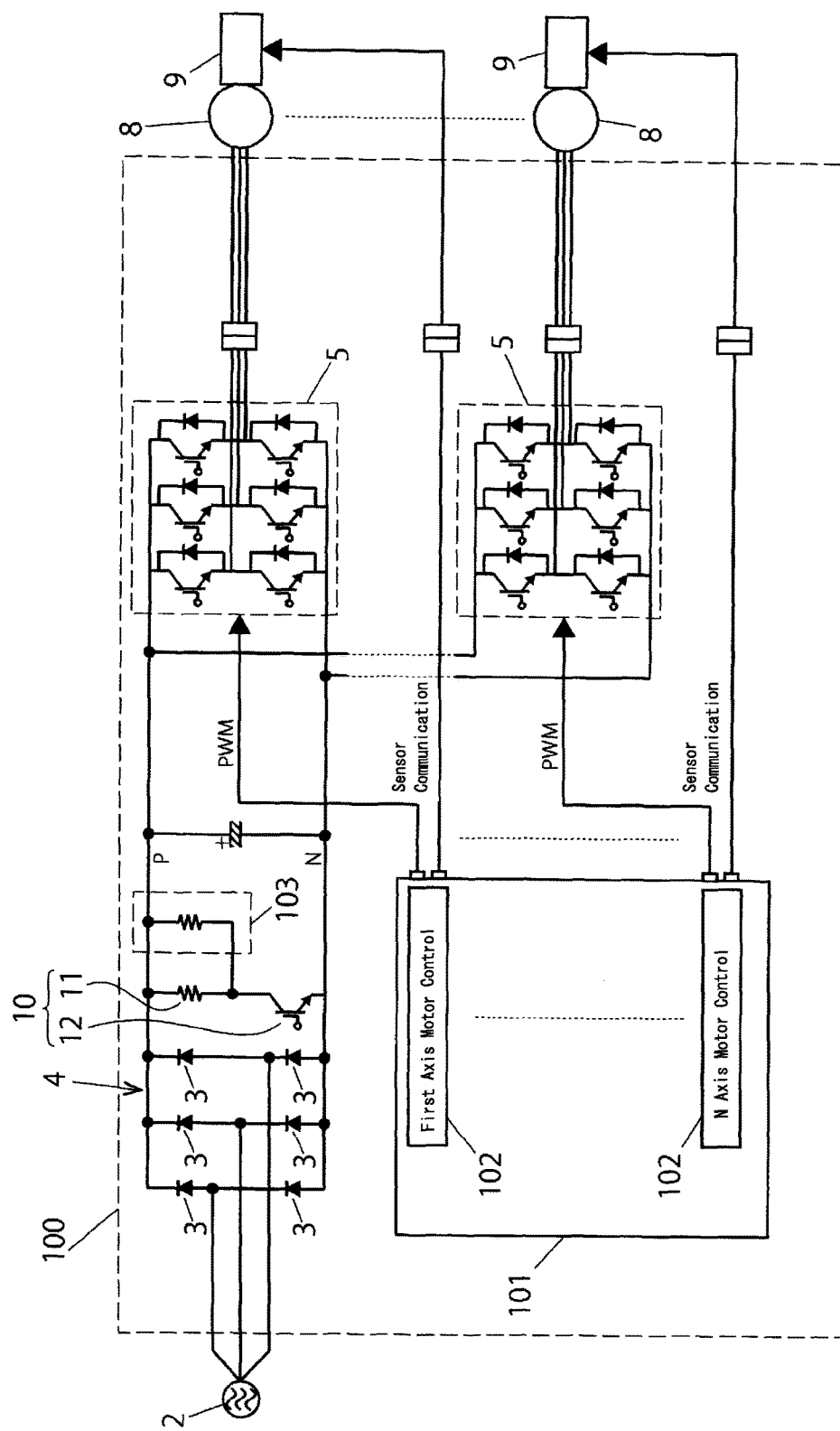
FIG. 2 is a block diagram illustrating an example of conventional robot control systems.

FIG. 2 illustrates a configuration when the regenerating function is reinforced in a conventional robot control system.

As illustrated in FIG. 2, in a conventional robot control system 100, a motor control portion 102 of a servo control device thereof does not comprise the power supply regenerating control function. Therefore, a regenerative resistor 103 is added to the resistance regenerating circuit 10 in order to deal with increase of the regenerative energy. Namely, the additional regenerative resistor 103 is provided in parallel with the standardly mounted regenerative resistor 11.

In the conventional method above, there is a problem from the viewpoint of effective utilization of energy as well, since coping with considerable increase of the regenerative energy is difficult and also regenerative energy consumption is increased.

In contrast, by the robot control system 1 according to the embodiment, the power supply regenerating function can be added easily as above, and therefore the regenerative resistor does not need to be added and energy can be utilized effectively.

REFERENCE SIGNS LIST

1 . . . robot control system
2 . . . three-phase AC power supply
3, 6 . . . diode (rectifier element)
4 . . . converter
5, 5A, 5N . . . inverter
7, 12 . . . switching element
8, 8A, 8N . . . servo motor
9, 9A, 9N . . . motor sensor (encoder)
10 . . . resistance regenerating circuit
11 . . . regenerative resistor
13 . . . servo control device
14, 14A, 14N . . . motor control portion
15, 15A, 15N . . . control port portion
16, 16A, 16N . . . power supply regenerating control function portion
17, 17A, 17N . . . control function portion for servo motor
18N . . . connector of servo motor
19N . . . connector of inverter
20A, 20N . . . port for PWM
21N . . . connector of motor sensor
22A, 22N . . . port for sensor communication
23N . . . wiring for sensor communication
24 reactor
25 . . . wiring connecting reactor and three-phase AC power supply
26 . . . primary voltage sensor portion (phase detection portion)
27 . . . connector of primary voltage sensor portion
28 . . . connector of reactor
29 . . . smoothing capacitor

The invention claimed is:

1. A robot control system, comprising:
a converter configured to convert an AC current from an AC power supply into a DC current;
an inverter configured to invert a DC power supplied from the converter into an AC power;
a servo control device configured to control a drive of a servo motor based on a signal from a motor sensor attached to the servo motor, and
a resistance regenerating circuit configured to consume a regenerative energy generated in the servo motor,
wherein the servo control device has a plurality of motor control portions configured to enable a plurality of servo motors to be controlled and a plurality of control port portions corresponding to the plurality of motor control portions, and
at least one of the plurality of motor control portions has a power supply regenerating control function portion configured to control a power supply regenerating circuit including an inverter having a configuration in common with the inverter for the servo motor and is configured such that the power supply regenerating control function portion and a control function portion for the servo motor can be switched depending on whether an object to be connected to the control port portion is the power supply regenerating circuit or the servo motor.

2. The robot control system according to claim 1, wherein all of the plurality of motor control portions have the power supply regenerating control function portion.

3. The robot control system according to claim 1, further comprising the power supply regenerating circuit.

4. The robot control system according to claim 3, wherein the power supply regenerating circuit has a reactor connected to the AC power supply and a primary voltage sensor portion connected to a wiring connecting the reactor and the AC current power supply so as to detect a primary voltage.

5. The robot control system according to claim 1, wherein the inverter has a plurality of rectifier elements and a plurality of switching elements each connected in parallel with the corresponding one of the plurality of rectifier elements.

* * * * *